United States Patent
Waller et al.

(10) Patent No.: US 6,363,448 B1
(45) Date of Patent: Mar. 26, 2002

(54) SET TOP BOX INTEGRATED CIRCUIT

(75) Inventors: Arthur Simon Waller; Jurgen Geerlings, both of Basingstoke (GB); Daniel Alexander Temple, Frederiksberg (DK)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/206,573

(22) Filed: Dec. 7, 1998

(Under 37 CFR 1.47)

(30) Foreign Application Priority Data

Dec. 9, 1997 (GB) .............................................. 9726048

(51) Int. Cl.[7] .............................................. G06F 13/38
(52) U.S. Cl. ........................ 710/126; 710/128; 710/129
(58) Field of Search ................................ 710/126, 128, 710/129, 131

(56) References Cited

U.S. PATENT DOCUMENTS

| | | | |
|---|---|---|---|
| 5,239,654 A | 8/1993 | Ing-Simmons et al. ..... | 395/800 |
| 5,548,730 A | 8/1996 | Young et al. ................ | 395/280 |
| 5,557,758 A | 9/1996 | Bland et al. ................ | 395/308 |
| 5,606,672 A | 2/1997 | Wade .......................... | 395/308 |
| 5,890,115 A * | 3/1999 | Cole .......................... | 704/258 |
| 5,929,849 A * | 7/1999 | Kikinis ....................... | 345/327 |
| 5,941,968 A * | 8/1999 | Mergard et al. ............ | 710/128 |
| 6,038,630 A * | 3/2000 | Foster et al. ................ | 710/132 |

FOREIGN PATENT DOCUMENTS

| | | | |
|---|---|---|---|
| EP | 0 747 872 A1 * | 11/1996 | ............ G09G/1/16 |
| EP | 0 747 829 A1 | 12/1996 | |
| EP | 0 747 830 A1 | 12/1996 | |
| EP | 0 747 872 A1 | 12/1996 | |
| GB | 2 286 910 A | 8/1995 | |
| WO | WO 97/44740 | 11/1997 | |

* cited by examiner

Primary Examiner—Ario Etienne
(74) Attorney, Agent, or Firm—Frommer Lawrence & Haug LLP; William S. Frommer

(57) ABSTRACT

An integrated circuit for use in a digital set top box including at least one control unit, a plurality of data processing units and common data bus for connecting at least two of the processing units to a common external memory wherein two or more common data buses may be provided for the plurality of data processing units and, where there are a plurality of control units, a separate control bus may be provided connecting the control units.

8 Claims, 2 Drawing Sheets

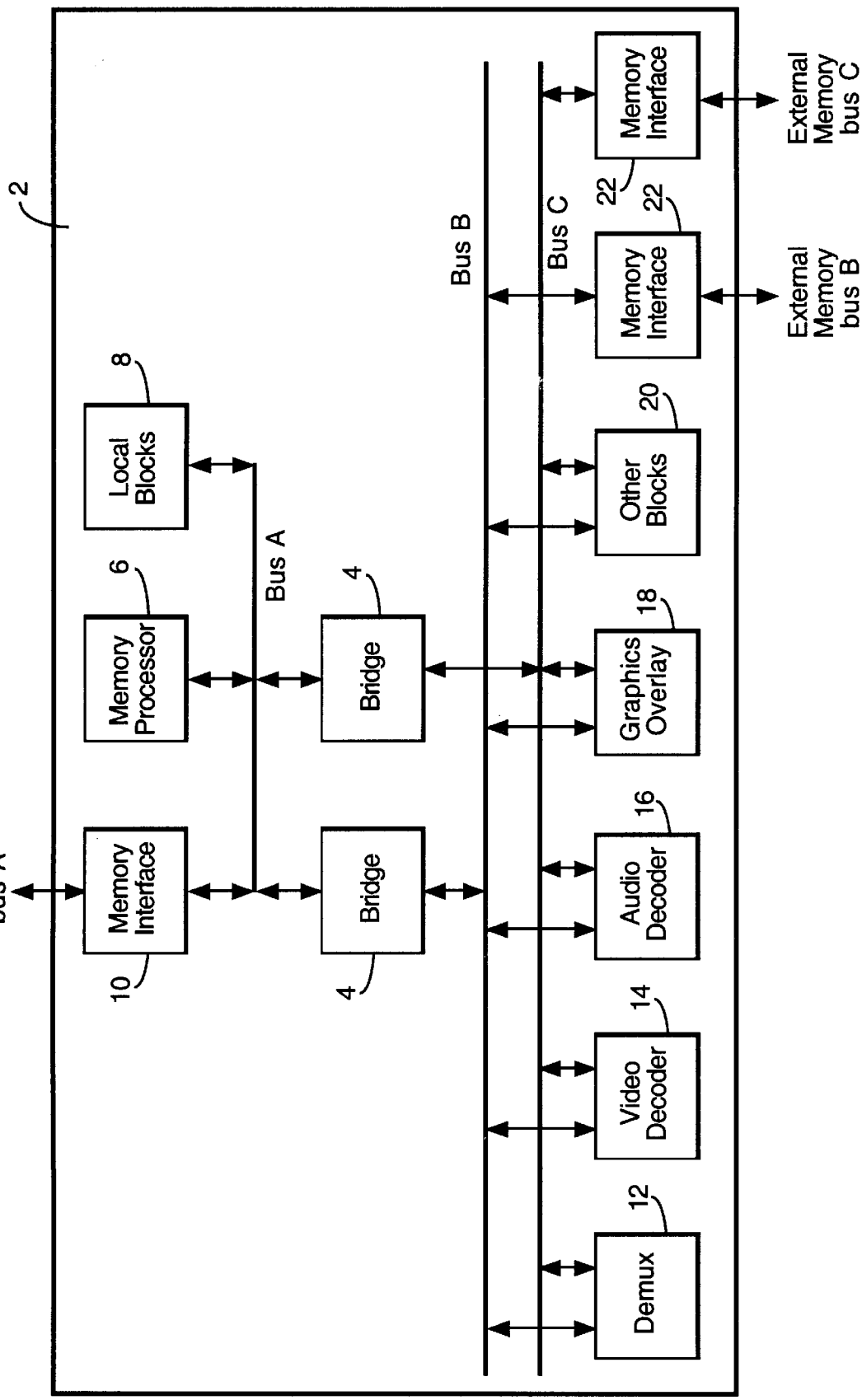

SET TOP BOX INTEGRATED CIRCUIT

BACKGROUND OF THE INVENTION

1. Field of the Invention

The present invention relates to an integrated circuit, more particularly an integrated circuit for use in a digital set top box.

2. Description of the Related Art

Devices, known as set top boxes, are known for use with standard television sets to enable those television sets to receive video and/or audio signals transmitted over cable or satellite networks.

The set top boxes receive many channels of video and audio data which are coded and multiplexed. The set top box must, therefore, according to the particular application, include various processing units for such functions as demultiplexing, video decoding, audio decoding, graphic overlay, etc. The set top box must also include at least one control unit for controlling the various processing units. Various memories are also provided in the set top box for storing control data on the one hand and video/audio data on the other hand as it is processed.

FIG. 1 of the accompanying drawings illustrates the various functional units of a digital set top box and their inter-relating connections.

It is desirable for reasons of cost, reliability and ease of manufacture, to implement the core functionality of a set top box in a single integrated circuit. However, new types of application being run on set top boxes require more powerful graphics and processor power, whilst still demanding a reduction in the total system cost.

The apparatus illustrated in FIG. 1 could be embodied in a single integrated circuit. However, all of the various memories add considerably to the required size and cost of the integrated circuit. For example, the demultiplexer might require 512 kbytes memory, the video decoder 2 Mbytes, the graphics overlay 1 Mbyte and the main processor 2 Mbytes.

An alternative approach would be to integrate all or most of the components, but omitting in particular the memories. However, with increasing system integration, more processor units are included in the integrated circuit and, hence, more pins are required on the integrated circuit to allow access to the extra external memories required for the respective processor units. With the increasing core functionality and decreasing geometry available for new integrated circuits, too many pins are required to make it economical.

OBJECTS AND SUMMARY OF THE INVENTION

The present invention is based on the realisation that the above problems can be overcome by providing the processor units with a shared common memory. In particular, various processing units can be connected to a common data bus which feeds a memory interface for accessing an external memory.

Thus, according to the present invention, there is provided an integrated circuit for use in a digital set top box, the integrated circuit including:
   at least one control unit;
   a plurality of processing units;
   at least two buses each connected to at least two of said units; and
   respective memory interfaces connected to said buses for transferring data to and from an external memory.

According to the present invention, there is also provided a method of integrating control and processing units for a digital set top box, the method comprising:
   providing the control and processing units in an integrated circuit;
   providing at least two buses on the integrated circuit each connecting at least two of the units; and
   providing respective memory interfaces on the integrated circuit for the buses for transferring data to and from an external memory.

In this way, the present invention allows the core functionality of a set top box, including all of the key processor units, to be included in a single integrated circuit. Since all the units on a bus use the same memory, only a small number of pins are required to access that external memory. Furthermore, the cost of the single high capacity memory is considerably less than that of multiple individual memories and their associated connections.

Unfortunately, the data bandwidth between the memory and the integrated circuit is finite and some of the processing units, particularly the video decoder, require frequent and long access to the memory to perform their function. When one of the processing units is operating in this way, other functions of the set top box are thereby inhibited.

Hence, it is proposed that said buses include first and second data buses each connected to at least two of said plurality of processing units; and
   a memory interface connected to said second data bus for transferring data to and from a respective external memory.

It is also proposed that a method of integrating control and processing units for a digital set top box further comprises:
   connecting at least two of the processing units to one of said buses on the integrated circuit; and
   connecting at least two of the processing units to another one of said buses on the integrated circuit.

In this way, when one of the processing units has long access with an external memory, other processing units can still use the other external memory. Furthermore, each processing unit, by being connected to each data bus, can have access to both external memories.

Although the invention as defined above uses two or more external memories, this is still significantly advantageous when compared to using individual memories for each processing unit.

By means of the two data buses and two external memories, it is also possible for particularly intensive data processing to make use of both memories. In particular, a processing unit, such as the video decoder, may make use of both external memories for very high quality graphics, whereas, for normal applications, the video decoder can use one external memory, while the audio decoder uses the other external memory.

Unfortunately, for an arrangement such as illustrated in FIG. 1, while a processing unit, such as the video decoder, is in communication with the memory, control processes of the set top box are inhibited. In particular, a plurality of control units may need to communicate with one another. For instance, control programs may have to be retrieved from ROM and other control data stored or retrieved from memories or input/output devices.

Hence, it is proposed that the integrated circuit further comprises:
   at least two control units and one of said buses is a control bus connected to all of the control units.

It is also proposed that the method of integrating control and processing units for a digital set top box further comprises:

connecting all of the control units to one of said buses on the integrated circuit not used for connecting processing units.

In this way, while data processing is conducted by the processing unit, the control units of the integrated circuit may still fully function and/or communicate with any external devices.

Preferably, each data bus is provided with a respective bridging unit connecting the data bus to the control bus.

It will be appreciated that the data processing operations, particularly for video data, have to take place at a relatively high data rate. On the other hand, control data is usually processed at a lower data rate. By means of the present invention, the lower data rate communication of the control units does not inhibit operation of the processing units at their full speed. Only when a control unit needs to communicate with a processing unit or one of the external memories connected to the data bus does any data transfer between the control bus and the or a data bus. Any such transfer of data between the buses is controlled by the bridge. In this respect, it is possible for the bridge to act as a buffer and, where the control and data buses operate at different rates, to transmit or receive data at the appropriate rate.

Preferably, the integrated circuit further comprises a main memory interface connected to the control bus for transferring data to and from an external memory.

In this way, in a similar way as for the processing units, the control units may make use of their common control bus to transfer data with an external memory.

The processing units may include one or more of a demultiplexer, a video decoder, a video encoder, an audio decoder, an audio encoder, a graphics processor, a DMA engine and an input/output or network interface for instance for ATM, IEEE 1394 OR IEEE 1284.

The control units may include one or more of a main processor, an input/output interface, an I²C interface, UART, a smartcard interface, a memory interface, ROM, RAM, FLASH memory and a DMA engine.

In one particular embodiment, a DMA engine may be shared between the control and processing sides and be connected between the control and data buses.

BRIEF DESCRIPTION OF THE DRAWINGS

FIG. 2 illustrates the functional units of an integrated circuit according to the present invention.

DETAILED DESCRIPTION OF THE PREFERRED EMBODIMENTS

Figure 1:
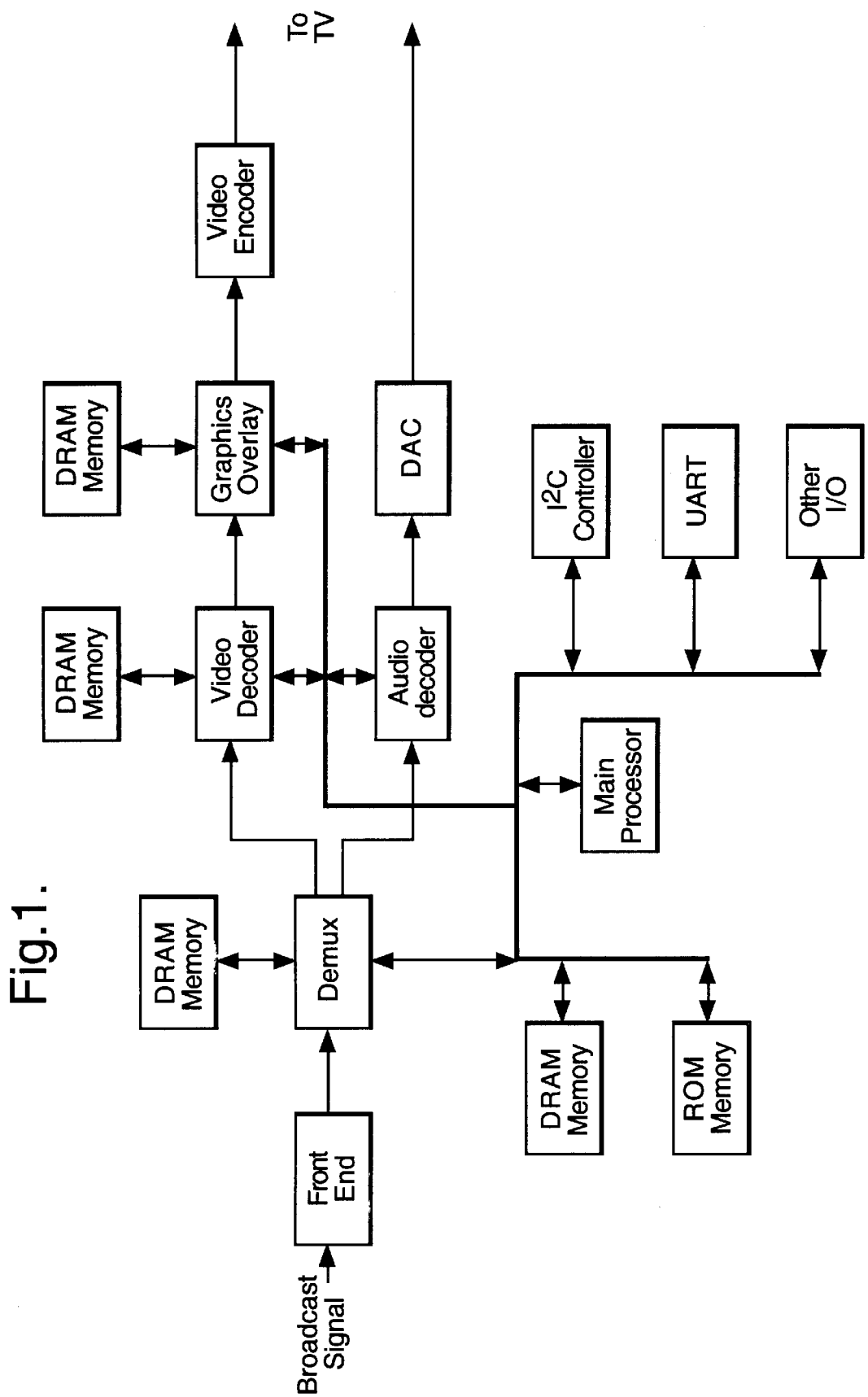
FIG. 1 illustrates the functional units of a digital set top box.

Specific embodiments of the invention will be described by way of example with reference to the accompanying drawings.

FIG. 2 illustrates schematically an integrated circuit 2 in which various functional units are provided. In practice, the functional units will not be positioned in the integrated circuit as illustrated. However, nevertheless, each functional unit will be formed generally at its own location within the integrated circuit and operate within the integrated circuit as if it were a separate circuit.

The architecture of the integrated circuit is generally divided in two halves separated by bridges 4. In one half, the bridges 4 connect with a control bus, bus A, and, in the other half, the bridges 4 connect with the two data buses, bus B and bus C.

The control bus, bus A, connects together a series of control units. These control units include a main processor 6 and other local blocks 8, such as, an I²C interface, UART, an input/output port and a ROM or FLASH memory. The control bus, bus A, as illustrated is also connected to a memory interface 10. This may be connected by pins of the integrated circuit to an external memory so as to allow access to that memory via the control bus.

On the other side of the integrated circuit, a plurality of processing units are each connected to both of the data buses, bus B and bus C.

As illustrated, the processing units include a demultiplexer 12 for demultiplexing various information signals from a received signal, a video decoder 14 for decoding received video signals, an audio decoder 16 for decoding received audio signals, a graphics overlay 18 unit for overlaying graphics on video images and other blocks 20 including other similar processing units. Where transmission of data occurs such as for video conferencing, video end audio encoders may also be provided together with suitable interfaces such as ATM, IEEE 1394 and IEEE 1284.

Each of data buses A and B has its own bridge 4 and emory interface 22.

By virtue of the above arrangement, the control units and the processing units may operate independently. The main processor 6 may access the other local blocks 8 or a memory, such as a ROM memory via the memory interface 10. This allows the main processor 6 to have uninterrupted access to its processor code, such that its performance is not impaired by the operation of the processing units. When the need arises, the main processor 6 can access any of the processing units by means of either data bus and its respective bridge 4. Indeed, the main processor 6 can also access the memory interfaces 22 and corresponding external memories for instance for use as RAM.

All the external memory is preferably mapped on to a single memory space so that the distinction between the different buses is hidden from the application programmer. In other words, as far as the processor is concerned, in order to access a particular unit, the processor merely issues an address listed in its memory space with no special action required regarding on which bus that unit is located.

By use of the two data buses, bus B and bus C, the high bandwidth requirements of a particular processing unit, such as the video decoder 14, can be isolated from any memory access required by other processing units. For example, when the video decoder is transferring data with an external memory via bus C, any of the other processing units may use bus B to access memory.

In principle, each processing unit may have access to both buses B and C. However, in the operation of a particular embodiment, this may not be allowed and one or more of the processing units may be set up to access only one of the buses. The bus used by each processor may be configured during the integrated circuit design or may be set up at run time. It is also possible for the set up to be changed dynamically depending upon the application being run. In other words, during set up or running of an application, a particular processing unit may be instructed to use only a particular bus.

The type of memory connected to the memory interfaces for buses B and C may be different. For instance, one may have EDO DRAM (Enhanced Data Output Dynamic RAM) and the other SDRAM (Synchronous Dynamic RAM).

Since the characteristics of the memory accesses are different for each processing unit, it is possible to optimize the processing unit to the type of memory to make best use of the available bandwidth. It is also possible for one processing unit to use both buses to efficiently utilize the available memory.

We claim:

1. An integrated circuit for use in a digital set top box, the integrated circuit comprising:

a plurality of control units;

a plurality of processing units;

a control bus connected to said plurality of control units;

first and second data buses each connected to at least two of said processing units and said control bus; whereby said first and second data buses transfer data between said plurality of processing units and said control bus; and respective memory interfaces connected to said control bus, said first data bus and said second data bus for transferring data to and from an external memory.

2. An integrated circuit according to claim 1, further comprising a plurality of bridge units connecting the control bus to said first and second data buses.

3. An integrated circuit according to claim 2 wherein at least one of said plurality of processing units is connected to both said first data bus and said second data bus.

4. An integrated circuit according to claim 1 wherein the processing units include one or more of a demultiplexer, a video decoder, a video encoder, an audio decoder, an audio encoder, a graphics processor, a DMA engine and an input/output or network interface for instance for ATM, IEEE 1394 OR IEEE 1284.

5. An integrated circuit according to claim 1 wherein the control units include one or more of a main processor, an input/output interface, an $I^2C$ interface, UART, a smartcard interface, a memory interface, ROM, RAM, FLASH memory and a DMA engine.

6. A method of integrating control and processing units for a digital set top box, the method comprising the steps of:

providing the control and processing units in an integrated circuit;

providing a control bus for connecting the control units;

providing first and second data buses on the integrated circuit each connecting at least two of the processing units and said control bus; whereby said first and second data buses transfer data between said plurality of processing units and said control bus; and providing respective memory interfaces on the integrated circuit connected to said control bus, said first data bus and said second data bus for transferring data to and from an external memory.

7. A method according to claim 6 further comprising the step of connecting at least one of the processing units to both said first data bus and said second data bus.

8. A method according to claim 7 comprising the step of providing a plurality of bridging units on the integrated circuit connecting said control bus to said first and second data buses.

* * * * *